(12) United States Patent
Zou et al.

(10) Patent No.: US 12,026,260 B2
(45) Date of Patent: Jul. 2, 2024

(54) DEEP-LEARNING BASED DEVICE AND METHOD FOR DETECTING SOURCE-CODE VULNERABILITY WITH IMPROVED ROBUSTNESS

(71) Applicant: Huazhong University of Science and Technology, Wuhan (CN)

(72) Inventors: Deqing Zou, Wuhan (CN); Jing Tang, Wuhan (CN); Zhen Li, Wuhan (CN); Hai Jin, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 428 days.

(21) Appl. No.: 17/444,612

(22) Filed: Aug. 6, 2021

(65) Prior Publication Data
US 2022/0292200 A1    Sep. 15, 2022

(30) Foreign Application Priority Data
Mar. 10, 2021    (CN) .......................... 202110263311.7

(51) Int. Cl.
*G06F 21/00* (2013.01)
*G06F 18/214* (2023.01)
(Continued)

(52) U.S. Cl.
CPC .......... *G06F 21/577* (2013.01); *G06F 18/214* (2023.01); *G06F 21/54* (2013.01);
(Continued)

(58) Field of Classification Search
None
See application file for complete search history.

(56) References Cited

U.S. PATENT DOCUMENTS

2019/0354688 A1* 11/2019 Ding ...................... G06N 7/046
2022/0004642 A1*  1/2022 Pujar ..................... G06F 21/577

FOREIGN PATENT DOCUMENTS

| CA | 3033014 | 8/2019 |
|---|---|---|
| CN | 107885999 | 4/2018 |

(Continued)

OTHER PUBLICATIONS

Chinese Office Action mailed Mar. 24, 2022 in Chinese Application No. CN202110263311.7.

*Primary Examiner* — Andrew J Steinle
(74) *Attorney, Agent, or Firm* — Michael Ye; Kalos Athena Wang PLLC

(57) ABSTRACT

The present invention relates a device for improving robustness of deep-learning based detection of source-code vulnerability, the device at least comprises a code-converting module, a mapping module, and a neural-network module, wherein the mapping module is in data connection with the code-converting module, the mapping module is in data connection with the neural-network module, respectively, and the neural-network module includes at least two first classifiers, based on a received first training program source code, the mapping module maps a plurality of code snippets, and the neural-network module trains the at least two first classifiers according to a first sample vector. The present invention improves the robustness of detection of source-code vulnerability by performing classification training on the feature generators and the classifiers.

9 Claims, 2 Drawing Sheets

(51) Int. Cl.
*G06F 21/54* (2013.01)
*G06F 21/55* (2013.01)
*G06F 21/56* (2013.01)
*G06F 21/57* (2013.01)
*G06N 3/08* (2023.01)
*G06N 3/094* (2023.01)

(52) U.S. Cl.
CPC .......... *G06F 21/554* (2013.01); *G06F 21/563* (2013.01); *G06N 3/08* (2013.01); *G06N 3/094* (2023.01)

(56) References Cited

FOREIGN PATENT DOCUMENTS

| CN | 107885999 A | * | 4/2018 | ........... | G06F 21/577 |
|---|---|---|---|---|---|
| CN | 110222512 A | | 9/2019 | | |
| CN | 110543770 | | 12/2019 | | |
| CN | 111488582 B | * | 9/2023 | ........... | G06F 21/563 |

* cited by examiner

DEEP-LEARNING BASED DEVICE AND METHOD FOR DETECTING SOURCE-CODE VULNERABILITY WITH IMPROVED ROBUSTNESS

This application claims the benefit of the Chinese Patent Applications No. CN 202110263311. 7 filed on Mar. 10, 2021, which is hereby incorporated by reference as if fully set forth herein.

BACKGROUND OF THE INVENTION

1. Technical Field

The present invention relates to detection of source-code vulnerability, and more particularly relates to a method and a device for improving robustness of deep-learning based detection of source-code vulnerability.

2. Description of Related Art

As cybersecurity is nowadays a global crucial issue, and software vulnerability remains a problem unaddressed, it is more than ever important to have a solution that effectively detects and fixes unknown vulnerability and assures system security. At present, vulnerability detection based on static analysis is mainly achieved using similarity-based methods, rule-based methods, and machine-learning-based methods. Similarity-based vulnerability detection is designed for vulnerability caused by code replication. Rule-based vulnerability detection uses rules defined by experts to detect vulnerability, making it highly subjective and tending to have faults. By comparison, deep-learning-based vulnerability detection significantly reduce false negative and false positive because this approach vulnerability detection works without the need of manually defining features of vulnerability.

However, a deep-learning-based vulnerability detection model typically has inferior robustness and is subject to attacks caused by, for example, code shifting. Code shifting seen in source programs is known to have three variants: code shifting with semantic preservation, and code shifting with semantic proximity, and code shifting with semantic change. Commonly used tools for addressing code shifting include Tigress, Stunnix obfuscator, Sourceformatx, and Coccinelle. These code shifting approaches may be used in diverse areas, such as code format, code completion and refactoring, defense against reverse engineering, evaluation of code clone detection and evaluation of neural network program embedding, yet there has not been an application for vulnerability detection.

For example, China Patent No. CN103268281B discloses a method and a system for detecting the vulnerability of source codes. The method includes S1, acquiring programming language of the target detected source codes, and creating a security vulnerability rule base of the security vulnerability of source codes written according to the programming language; S2, compiling the target detected source codes to generate an intermediate representation file, analyzing the intermediate representation file, extracting contextual information of the intermediate representation file and storing the contextual information; S3, creating a context scheduling automatic state machine according to the stored contextual information; and S4, traversing state space in the automatic state machine, respectively judging whether the various state space in the automatic state machine is matched with rules in the security vulnerability rule base or not, and acquiring an execution path which generates the vulnerability if the state space is matched with the rules in the security vulnerability rule base.

There has not been research about improving robustness of deep-learning based detection of source-code vulnerability, and adversarial training is nevertheless an important approach to making a deep-learning based model more robust. Adversarial training is extensively applied in fields like image processing, voice recognition, malware detection. However, since the program language is structuralized in nature, adversarial training methods designed for images and contexts are not suitable for deep learning models related to source codes. Taking image processing for example, since image pixels change in a continuous manner, subtle changes in pixels are less perceptible and unlikely to have semantic influence. On the other hand, codes change in a more discrete way, and any tiny change in code elements can lead to syntax errors, making such changes more detectable and semantically influential on resulting statements. Recently, researches of source code applications in robustness of deep learning models have just been started. These researches are mainly focused on how to apply adversarial training to identification of author affiliation and prediction of how a function works, for example. While code shifting in theses occasions is reasonable to developers, it can lead to wrong classification results of deep-learning based models. Hence, there is a need for improving model robustness so as to better protect deep learning models from known attacks.

Further, since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with technical features known in the art as support.

SUMMARY OF THE INVENTION

In order to solve the problems of existing knowledge, the present invention provides a device for improving robustness of deep-learning based detection of source-code vulnerability, the device at least comprises a code-converting module, a mapping module, and a neural-network module, wherein the mapping module is in data connection with the code-converting module, the mapping module is in data connection with the neural-network module, respectively, and the neural-network module includes at least two first classifiers, based on a received first training program source code, the code-converting module generates a second training program source code with assailability by means of code converting, the mapping module maps a plurality of code snippets formed by separating the second training program source code to a second sample vector, and the neural-network module trains the at least two first classifiers according to a first sample vector corresponding to the first training program source code and a second sample vector corresponding to the second training program source code, respectively, until trained data reach a training threshold.

The present invention significantly improves model robustness. By employing two classifiers on the basis of an existing model, the disclosure involves decoupling feature learning of a neural network model from the classifiers, fixing generator parameters for feature learning, and training the classifiers for a decision boundary with increased difference; and then fixing the classifier parameters, training the generator for feature learning so as to reduce prediction differences between the two classifiers. Through the two-step iterative optimization, the two classifiers can converge to provide robust features and classifiers, thereby maximizing improvement of robustness of a deep-learning based vulnerability detection system.

Preferably, the neural-network module training feature generators and/or the classifiers based on a recurrent neural network model at least comprises: training at least one first feature generator and at least two said first classifiers based on the first sample vector corresponding to the first training program source code until a prediction difference between the at least two first classifiers is minimized; training at least two second classifiers based on the second sample vector corresponding to the second training program source code until a prediction difference between the at least two second classifiers is maximized; training the first feature generator that has been trained to have the minimized prediction difference into a second feature generator based on the second sample vector corresponding to the second training program source code and at least two said second classifiers that have been trained to have the maximized prediction difference.

Preferably, the neural-network module training feature generators and/or the classifiers based on a recurrent neural network model further comprises: training the second classifier and the first feature generator by means of iterative training.

Preferably, training the at least two second classifiers based on the second sample vector corresponding to the second training program source code comprises: calculating a first loss happening when the second classifiers classify the first sample vector, calculating a second loss happening when the second classifiers classify a hard sample in the second sample vector, and determining a prediction difference of the recurrent neural network model based on a difference between the first loss and the second loss.

Preferably, the first loss is calculated using an equation of:

$$L_c(X) = -\sum_{i=1}^{2} \{E_{x_s \sim X}[y_s \cdot \log(c_i^*(x_s, F)) + (1 - y_s) \cdot \log(1 - c_i^*(x_s, F))]\}$$

where $x_s$ denotes a vector, $y_s$ denotes a sample label, $c_i^*(x_s, F)$ denotes a prediction probability of the second classifier on a vulnerability sample.

Preferably, the second loss is calculated using an equation of:

$$L_h(X'') = E_{x_d''} \sim [|c_1^*(x_d'', F) - c_2^*(x_d'', F)|]$$

where $c_1^{**}(x_d'', F)$ denotes prediction probability of one of the second classifiers on a hard sample, and $c_2^*(x_d'', F)$ denotes prediction probability of the other of the second classifiers on the hard sample.

Preferably, determining the prediction difference of the recurrent neural network model based on the difference between the first loss and the second loss is achieved by calculating:

$$\min_{c_1^*, c_2^*} [L_c(X) - L_h(X'')]$$

where $L_c(X)$ denotes the first loss, and $L_h(X'')$ denotes the second loss of the hard sample.

The present invention further provides a device for detecting source-code vulnerability, at least comprising a mapping module and a neural-network module, wherein the mapping module and the neural-network module are in data connection, and the neural-network module includes at least two second classifiers, the mapping module maps a plurality of code snippets formed by separating a target program source code to a first sample vector, the neural-network module performs vulnerability detection based on the first sample vector corresponding to the first target program source code, where a prediction probability for a vulnerability sample is smaller than a threshold, determining that the target program source code is a vulnerability-free sample; where the prediction probability for the vulnerability sample is not smaller than the threshold, determining that the target program source code is a vulnerability sample, and wherein the second classifier is trained through: the mapping module separating a second training program source code generated by the code-converting module based on a first training program source code by means of code converting into a plurality of code snippets, and mapping the plurality of code snippets to a second sample vector, and the neural-network module training the at least two first classifiers according to a first sample vector corresponding to the first training program source code and a second sample vector corresponding to the second training program source code, respectively, until trained data reach a training threshold.

The present invention further provides a method for improving robustness of deep-learning based detection of source-code vulnerability, the device at least comprises a code-converting module, a mapping module, and a neural-network module, wherein the mapping module is in data connection with the code-converting module, the mapping module is in data connection with the neural-network module, respectively, and the neural-network module includes at least two first classifiers, based on a received first training program source code, the code-converting module generates a second training program source code with assailability by means of code converting, the mapping module maps a plurality of code snippets formed by separating the second training program source code to a second sample vector, and the neural-network module trains the at least two first classifiers according to a first sample vector corresponding to the first training program source code and a second sample vector corresponding to the second training program source code, respectively, until trained data reach a training threshold.

The method for improving robustness of deep-learning based detection of source-code vulnerability of the present disclosure, the neural-network module training feature generators and/or the classifiers based on a recurrent neural network model at least comprises: training at least one first feature generator and at least two said first classifiers based on the first sample vector corresponding to the first training program source code until a prediction difference between the at least two first classifiers is minimized; training at least two second classifiers based on the second sample vector corresponding to the second training program source code until a prediction difference between the at least two second classifiers is maximized; training the first feature generator that has been trained to have the minimized prediction difference into a second feature generator based on the second sample vector corresponding to the second training program source code and at least two said second classifiers that have been trained to have the maximized prediction difference.

The present invention provides the following beneficial effects:
(1) It helps to significantly reduce false negative false positive for sample detection after code shifting. By analyzing the degree and type of code shifting, the present invention achieves defense against adversarial samples, and provides an improved vulnerability detection method, which significantly reduces false negative and false positive for detection of sample vulnerability after code shifting.
(2) The disclosed method is versatile and independent of vulnerability detection methods. The present invention proposes a method for detecting source-code vulnerability based on deep learning by analyzing uses of code snippets of different levels of granularity, various code representations and various neural networks.

DETAILED DESCRIPTION OF THE INVENTION

Figure 1:
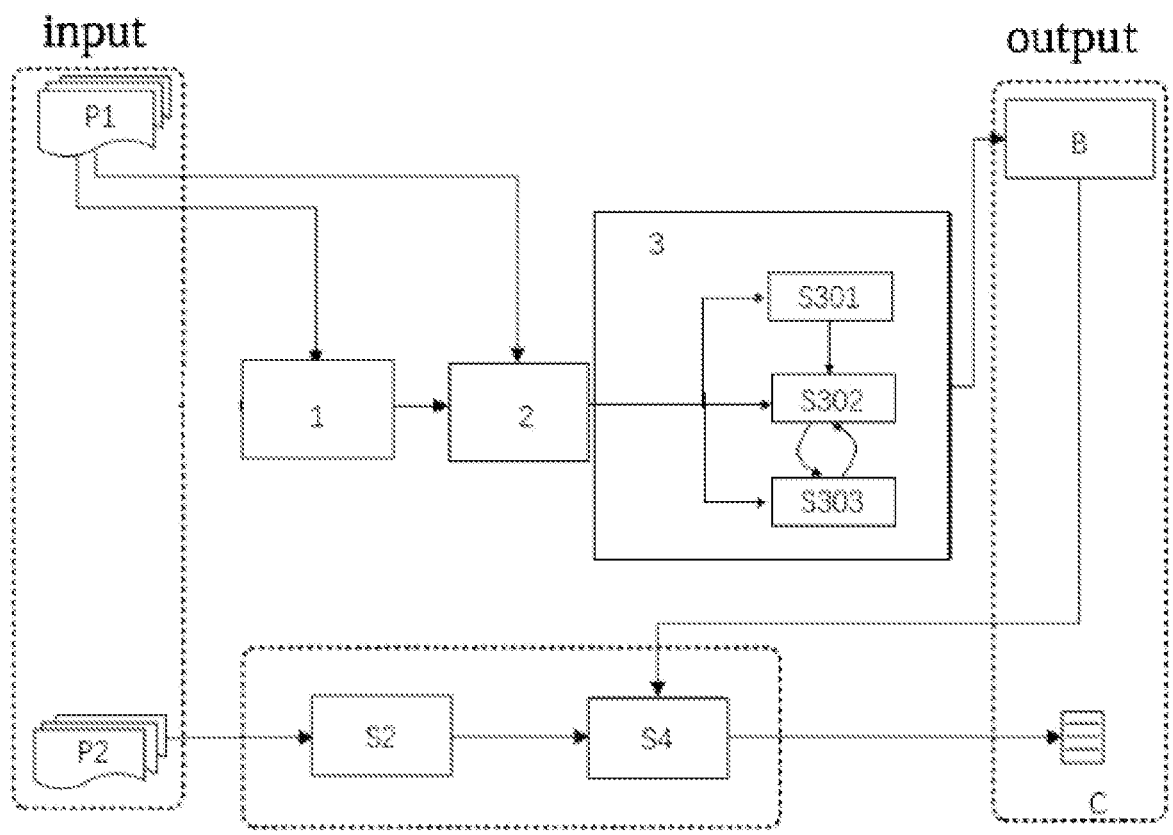
FIG. 1 is a block diagram showing the flow of a method of the present invention.

The following description details the present invention with reference to the accompanying drawings.

In view of the shortcomings of the prior art, the present invention provides a deep-learning based method for device for detecting source-code vulnerability with improved robustness as well as a device and a system using the method.

As used herein, the term "robustness" refers to how a vulnerability detection model is capable of classifying samples with high stability, low false negative, and low false positive.

As used herein, the term "training program source code" refers to any program source code.

As used herein, the term "recurrent neural network model" refers to a neural network model formed by any existing neural network, such as LSTM and GRU.

In the present invention, a first input module P1 is used to store the first training set program source code and input it into a code-converting module.

A second input module P2 is used to store a target source code to be checked and input into the same code-converting module.

Each of the first input module P1 and the second input module P2 may be one or more of an application specific integrated circuit, a processor, a server, a cloud server, or a storage that is able to store data and supports data transmission.

Embodiment 1

In the present invention, a device or system for improving robustness of deep-learning based detection of source-code vulnerability at least comprises a code-converting module 1, a mapping module 2 and a neural-network module 3. The code-converting module 1 and the mapping module 2 are in data connection with each other. The mapping module 2 and the neural-network module 3 are in data connection with each other.

The code-converting module 1 and the mapping module 2 may each be implemented as hardware such as one or more of an application specific integrated circuit, a processor, a server, and a cloud server.

The code-converting module 1 is used to perform code shifting on the first training set program source code, so as to generate a sample that is attackable to the original vulnerability detection model.

The mapping module 2 is used to use the second training set program source code after code shifting to generate code snippets, and map them into second sample vectors. It also uses the first training set program source code without code shifting to generate code snippets and maps them into first sample vectors.

The code snippets at least include code snippets with function-level or clip-level granularity.

The neural-network module 3 based on the first sample vector corresponding to the first training set program source code and the second sample vector corresponding to the code shifting program trains at least two classifiers.

The code-converting module 1 when operating performs the following steps.

S1 involves inputting a source code of the first training set program and at least one code shifting method, so as to generate at least one type of code shifting programs.

In the present invention, depending on the structures of source codes, at least two levels of code shifting can be differentiated. The types are listed in Table 1. The first type is data shifting, which is about changing the data structures of programs, such as by altering the names of variables, the names of functions, strings, and reordering function parameters. The second type is control shifting, which is about modifying the control structures of programs, such as by merging plural functions into one function, taking a basic block apart into several functions, and removing a part of the control flow of a function.

TABLE 1

Types of code shifting

| Type | Description |
| --- | --- |
| I | Data shifting |
| I-1 | Changing identifier (e.g., names of variables and names of functions) |
| I-2 | Replacing a string with a function call |
| I-3 | Replacing an identifier with a function call or a variable |
| I-4 | Reordering function parameters |
| I-5 | Adding a pseudo parameter to a function |
| I-6 | Exchanging a pointer and an array |
| I-7 | Replacing a macro definition identifier with a static value |
| I-8 | Dividing a definition statement or an initialization statement into plural statements |
| I-9 | Merging plural definition statements or initialization statements |
| II | Controlling shifting |
| II-1 | Merging plural functions |
| II-2 | Dividing a function |
| II-3 | Structurally interconverting a For-loop and a while-loop |
| II-4 | Removing a control flow form a function |

Figure 2:
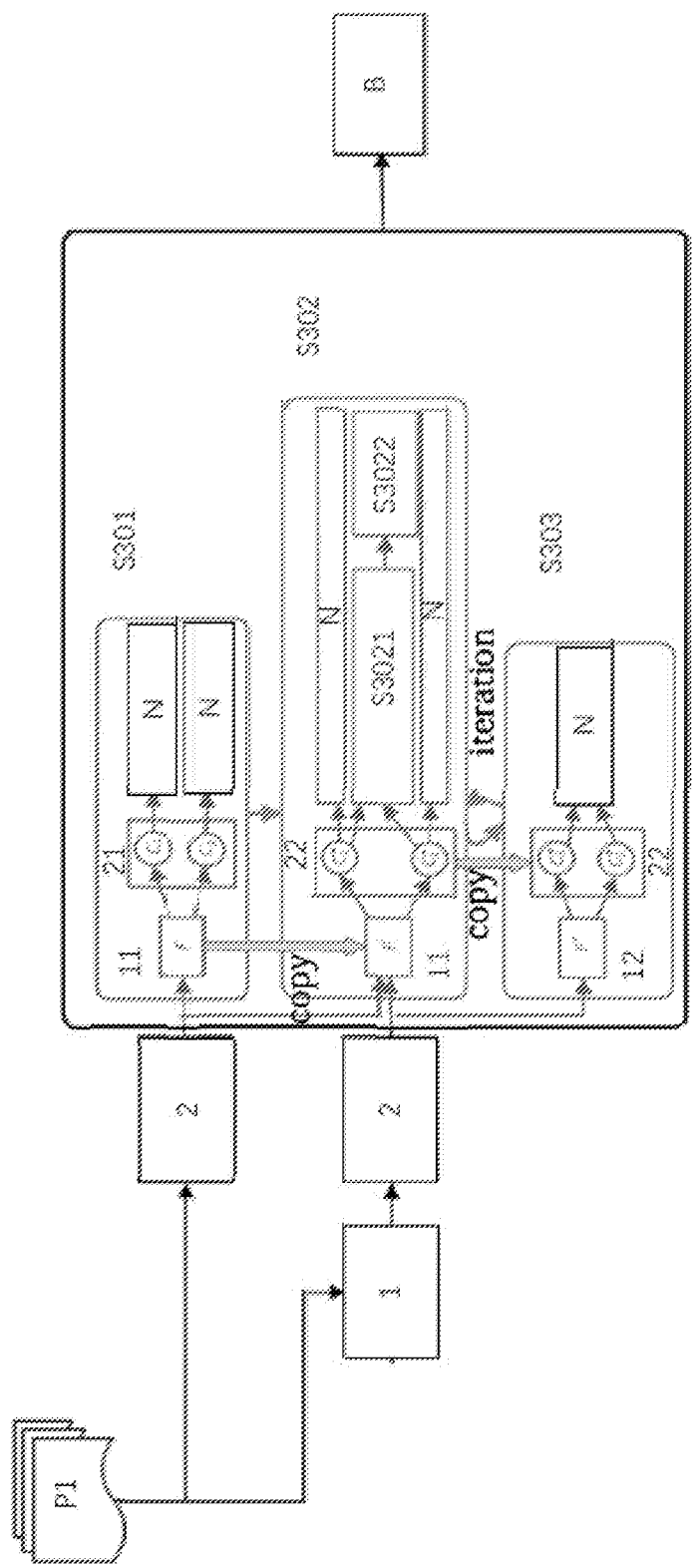
FIG. 2 is a block diagram of an improved neural network according to the present invention.

As shown in FIG. 2, for a vulnerability program CVE-2012-0849 having integer overflow vulnerability, the original vulnerability function is divided into two new functions by means of code shifting as shown as Type II-2 in Table 1.

The code in the dotted-line frame ① in FIG. 2(a) is revised into a call for the new function 1_ff_j2k_dwt_init_ff_j2k_dwt_init_split_1 as shown in the dotted-line frame ④ in FIG. 2(b).

The code in the dotted-line frame ② in FIG. 2(a) is revised into a call for the new function_1_ff_j2k_dwt_init_ff_j2k_dwt_init_split_2 as shown in the dotted-line frame ⑤ in FIG. 2(b).

Meanwhile, the shifting modifies the for-loop in the dotted-line frame ③ in FIG. 2(a) into a while-loop in the dotted-line frame ⑥ in FIG. 2(b), and replaces the array with a pointer.

In the present invention, opposite to a source code, a code shifting program as the result of shifting changes the data structure and the control structure, and therefore semantically identical program code shifting can make code features obtained through training no more applicable, thereby achieving model attack.

By analyzing the degree and type of code shifting, the present invention achieves defense against adversarial samples, and provides an improved vulnerability detection method, which significantly reduces false negative and false positive for detection of sample vulnerability after code shifting.

The mapping module 2 generates code snippets with function-level and clip-level granularity, and maps them into second sample vectors through the following steps.

S2 involves generating each training program source code as code snippets with different levels of granularity.

Specifically, the code snippets include snippets of function-level and clip-level granularity. The function-level code snippets extract vulnerability functions from each training program source code, and the clip-level code snippet are generated as described below.

S201 involves, according to syntax features of the program source code, extracting suspected vulnerability features.

Clang is used to generate an abstract syntax tree for the program source code, and elements related to vulnerability codes are selected from the abstract syntax tree, such as API function calling, pointer usage, array usage and other elements that are highly related to vulnerability.

S202 involves extracting codes related to the suspected vulnerability elements from the program source code, so as to generate program clips.

According to the control dependence and data dependence in the program source code, a program dependence graph is generated. Then for each of the extracted suspected vulnerability elements, the related code is extracted from the program dependence graph, so as to generate program clips.

S203 involves, according to the execution sequence of the functions in the program source code, adjusting the code sequences in the clips.

The statements related to vulnerability elements extracted from the program source code are not arranged in the sequence the program executes them. Therefore, the code positions in the clips have to be adjusted according to the function-calling sequence, so as to make the code sequences in the clips consistent with the program execution program.

In S204, if a program clip corresponding to the training program source code contains any known vulnerability code, a label indicating that there is vulnerability is added to that program clip, or, otherwise, a vulnerability-free label is added to that program clip.

S205 involves pre-processing program clips and mapping them into sample vectors.

According to lexical analysis, word-segmentation processing is performed on the program clips to obtain word sequences, and using any one of doc2vec, word2vec, and the one-hot method to map each word into a corresponding vector. Through adjustment of parameters, a superior encoding method is obtained, and depending on the actual lengths of the clips, making all the clips being the same fixed length by adding 0 to make up the clips or truncating the clips at tails.

The neural-network module 3 is trained through the following steps.

S301 involves entering the first sample vectors corresponding to the first training program source code into a recurrent neural network, so as to train the at least one first feature generator and the at least two first classifiers that form the neural-network module.

The feature generator may be formed by any of existing neural networks, such as LSTM, GRU, and CNN. The feature generator learns features of samples through training.

Preferably, the at least two first classifiers 21 of the neural-network module is obtained by using different initialization parameters before training. Therein, the respective probabilities that the two first classifiers predict vulnerability samples are calculated using an activation function. After code shifting, many samples could become wrongly classified. The at least one first feature generator and the at least two first classifiers are trained to be capable of correctly classifying vectors corresponding to all the training program source codes.

Specifically, at the beginning of training, for initialization of the two first classifiers, different initial parameters are used. The probabilities that the two first classifiers predict vulnerability samples are $C_1(X_s, F)$ and $C_2(X_s, F)$, respectively, where $0 \leq C_1(X_s, F)$ and $C_2(X_s, F) \leq 1 \cdot X_s (1 \leq s \leq \mu)$ is a vector whose sample label is $\gamma_s$. During training, the samples corresponding to all the training program source codes are used to train the first feature generator and the two first classifiers, thereby minimizing the loss of the first classifier. Then cross-entropy is used to calculate the loss of the neural network model.

When the first classifier has been trained and has the minimal prediction difference, the first classifier forms the second classifier.

In S302, the at least two second classifiers are trained again, so that the prediction difference between the two second classifiers is maximized.

Specifically, the first sample vectors mapped from the samples corresponding to the training program source code and the second sample vectors mapped from the samples corresponding to the shifting program are input to the recurrent neural network to train the two second classifiers, so that the prediction difference between the two second classifiers is maximized.

Since the two first classifiers $C_1$ and $C_2$ obtained through the training of S301 are very similar and unable to correctly classify samples after code shifting, the objective herein is to train the two first classifiers so that the prediction difference between the two first classifiers is maximized.

This step takes the two second classifiers $C_1$ and $C_2^*$ after the first training as the training result, and processes the target program sample before and after code shifting, respectively. The first classifier is able to correctly classify the first samples corresponding to the pre-shifting training set program source code. For this kind of examples, the loss is calculated using the corresponding equation according to S301.

In S3021, for the post-shifting second samples corresponding to the training set program source code, the prediction difference between the second classifiers is calculated using the samples that were wrongly classified among the second samples.

The probabilities that the two second classifier $C_1$ and $C_2^*$ predict vulnerability samples are $C_1^*(X_s,F)$ and $C_2^*(X_s,F)$. For the first samples corresponding to training set program source code before code shifting, the difference loss of the first classifier is calculated using the following equation:

$$L_C(X) = -\sum_{i=1}^{2} \{E_{x_s \sim X}[y_s \cdot \log(c_i^*(x_s, F)) + (1-y_s) \cdot \log(1 - c_i^*(x_s, F))]\} \quad (1)$$

where $x_s$ denotes a vector; $y_s$ denotes an sample label; F denotes the first feature generator; $c_i^{**}(x_s, F)$ denotes the probability that the second classifier predicts vulnerability samples; and $E_{x_s \sim x}$ denote the statistically expected values of the vectors in the first samples.

In S3022, for the second samples corresponding to the training set program source code after code shifting, the samples that are classified differently by the two second classifiers and are classified wrongly by both of the second classifiers are determined as hard negatives X". The loss of the two second classifiers for the hard negatives is obtained from the absolute value of the difference between the prediction probabilities of the two second classifiers predicting hard negatives. The calculation is achieved using the following equation:

$$L_h(X") = E_{x_d" \sim x"}[|c_1^*(x_d",F) - c_2^*(x_d",F)|] \quad (2)$$

The loss of the neural network model is:

$$\min_{C_1^* C_2^*}[L_c(X) - L_h(X")] \quad (3)$$

where $E_{x_d" \sim x"}$ denote the statistically expected values of the vectors in the hard negative $X^"$, $c_1^*(x_d",F)$ denotes the prediction probability of one of the second classifier, and $c_2^*(x_d", F)$ denotes the prediction probability of the other second classifier.

The present invention uses the loss to update the parameters of the neural network model during training, and performs training so that the difference between the two second classifiers is maximized.

By training the two second classifiers so, the maximized prediction differences for false negative and false positive can be obtained.

S303 involves training the second feature generator, so that the prediction difference between the two second classifiers is minimized.

To generate vulnerability features more robust against code shifting, the step minimizes the prediction difference between the two second classifiers $C_1$ and $C_2^*$ through training the second feature generator $F^*$.

The second feature generator $F^*12$ trained in step S301 and the two second classifiers $C_1^*$ and $C_2^*$ trained in S302 are used. All the samples after code shifting are used as input contents for further training the second feature generator 12.

As shown in FIG. 3, the present invention performs iterative training using the steps S302 and S303 to obtain more robust features and more robust classifiers.

The present invention significantly improves model robustness. By employing two classifiers on the basis of an existing model, the disclosure involves decoupling feature learning of a neural network model from the classifiers, fixing generator parameters for feature learning, and training the classifiers for a decision boundary with increased difference; and then fixing the classifier parameters, training the generator for feature learning so as to reduce prediction differences between the two classifiers. Through the two-step iterative optimization, the two classifiers can converge to provide robust features and classifiers, thereby maximizing improvement of robustness of a deep-learning based vulnerability detection system.

In S4, a deep learning model module B formed by the trained second feature generator and the trained second classifiers is the disclosed vulnerability detection device featuring smart detection of vulnerability for samples corresponding to a target program source code.

The sample corresponding to the target program source code to be checked are mapped into vectors by the mapping module 2. Then the trained recurrent neural network model is input to the deep learning model module B formed as described above, so as to obtain the output of the recurrent neural network model. If the output result exceeds a threshold, it is determined that the sample is a vulnerability sample. Otherwise, the sample is determined as a non-vulnerability sample.

For example, the vectors mapped from the target program samples are input to the trained vulnerability detection model, so as to obtain the probability that an sample limited to [0,1] is predicted as a vulnerability sample. If the result is smaller than the threshold, that clip is determined as a vulnerability-free sample. Otherwise, it is determined as a vulnerability-containing sample.

Embodiment 2

As the present embodiment is made for further illustrating Embodiment 1, repeated description is omitted herein for conciseness.

The present embodiment provides a deep-learning based method for detecting source-code vulnerability with improved robustness. The method at least comprises:
converting a first training program source code into an attackable second training program source code by means of code shifting,
mapping a plurality of code snippets formed by separating the second training program source code in a second sample vectors,
based on the first sample vector corresponding to the first training program source code and the second sample vector corresponding to the second training program source code, training at least two first classifiers 21, respectively, until the trained data reach a predetermined training threshold. The training threshold refers to a classification probability set for training.

Preferably, the neural-network module 3 trains the feature generator and/or the classifiers based on the recurrent neural network model at least comprises:
based on the first sample vector corresponding to the first training program source code training at least one first feature generator and at least two the first classifier until at the prediction difference between the least two first classifiers is minimized, at which time the first classifier forms the second classifier;
based on the second sample vector corresponding to the second training program source code training at least two second classifiers until the prediction difference between the at least two second classifiers is maximized;
based on the second sample vector corresponding to the second training program source code and at least two the second classifiers between which the prediction difference has been maximized, training the first feature generator whose prediction difference is minimized into the second feature generator.

The neural-network module 3 training the feature generator and/or the classifiers based on the recurrent neural network model comprises:

training the second classifier and the first feature generator by means of iterative training.

Preferably, training the at least two second classifiers further comprises: calculating a first loss happening when the second classifiers classify the first sample vector, calculating a second loss happening when the second classifiers classify a hard negative in the second sample vector, and determining a prediction difference of the recurrent neural network model based on a difference between the first loss and the second loss.

Preferably, the first loss is calculated using the following equation:

$$L_c(X) = -\sum_{i=1}^{2}\{E_{x_s \sim X}[y_s \cdot \log(c_i^*(x_s, F)) + (1-y_s) \cdot \log(1 - c_i^*(x_s, F))]\}$$

where $x_s$ denotes a vector, $y_s$ denotes an sample label, $c_i^*(x_s, F)$ denotes the probability that the second classifier predicts a vulnerability sample.

Preferably, the second loss is calculated using the following equation:

$$L_h(X'') = E_{x_d \sim x''}[|c_1^*(x_d'', F) - c_2^*(x_d'', F)|]$$

where $c_1^*(x_d'', F)$ denotes prediction probability of one of the second classifiers on the hard sample, and $c_2^*(x_d'', F)$ denotes prediction probability of the other of the second classifiers on the hard sample.

Preferably, based on the difference between the first loss and the second loss determining the prediction difference of the recurrent neural network model is achieved using the following equation:

$$\min_{c_1^* c_2^*}[L_c(X) - L_h(X'')]$$

where $L_c(X)$ denotes first loss, $L_h(X'')$ denotes the second loss of hard sample.

Embodiment 3

As the present embodiment is made for further illustrating Embodiments 1 and 2, repeated description is omitted herein for conciseness.

The present invention further provides a computer-readable storage medium. The computer-readable storage medium stores a computer program. The computer program is to be executed by a processor to perform the method as described in Embodiment 1 or Embodiment 2.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not come off the concept of the present invention should be encompassed by the appended claims.

The description of the present invention contains a number of inventive concepts, and the applicant reserves the right to file a divisional application based on each of the inventive concepts. The description of the present invention contains a number of inventive concepts, such as "preferably", "according to a preferred embodiment" or "optionally" all indicate that the corresponding paragraph discloses an independent idea, and the applicant reserves the right to file a divisional application based on each of the inventive concepts.

What is claimed is:

1. A method for improving robustness of deep-learning based detection of source-code vulnerability, the device at least comprises a code-converting module, a mapping module, and a neural-network module, wherein the mapping module is in data connection with the code-converting module, the mapping module is in data connection with the neural-network module, respectively, and the neural-network module includes at least two first classifiers, based on a received first training program source code, the code-converting module generates a second training program source code with assailability by means of code converting, the mapping module maps a plurality of code snippets formed by separating the second training program source code to a second sample vector, and the neural-network module trains the at least two first classifiers according to a first sample vector corresponding to the first training program source code and a second sample vector corresponding to the second training program source code, respectively, until trained data reach a training threshold.

2. The method of claim 1, wherein the neural-network module training feature generators and/or the classifiers based on a recurrent neural network model at least comprises:

training at least one first feature generator and at least two said first classifiers based on the first sample vector corresponding to the first training program source code until a prediction difference between the at least two first classifiers is minimized;

training at least two second classifiers based on the second sample vector corresponding to the second training program source code until a prediction difference between the at least two second classifiers is maximized;

training the first feature generator that has been trained to have the minimized prediction difference into a second feature generator based on the second sample vector corresponding to the second training program source code and at least two said second classifiers that have been trained to have the maximized prediction difference.

3. The method of claim 2, wherein the neural-network module training feature generators and/or the classifiers based on a recurrent neural network model further comprises:

training the second classifier and the first feature generator by means of iterative training.

4. The method of claim 3, wherein training the at least two second classifiers based on the second sample vector corresponding to the second training program source code comprises:

calculating a first loss happening when the second classifiers classify the first sample vector, calculating a second loss happening when the second classifiers classify a hard sample in the second sample vector, and determining a prediction difference of the recurrent neural network model based on a difference between the first loss and the second loss.

5. The method of claim 4, wherein the first loss is calculated using an equation of:

$$L_c(X) = -\sum_{i=1}^{2}\{E_{x_s \sim X}[y_s \cdot \log(c_i^*(x_s, F)) + (1 - y_s) \cdot \log(1 - c_i^*(x_s, F))]\}$$

where $x_s$ denotes a vector, $y_s$ denotes a sample label, $c_1^{**}(x_s,F)$ denotes a prediction probability of the second classifier on a vulnerability sample.

6. The method of claim 4, wherein the second loss is calculated using an equation of:

$$L_h(X) = E_{x_g'' \sim X} - [|c_1^*(x_d'',F) = c_2^*(x_d'',F)|]$$

where $c_1^{**}(x_d'',F)$ denotes prediction probability of one of the second classifiers on a hard sample, and $c_2^*(x_d''$, F) denotes prediction probability of the other of the second classifiers on the hard sample.

7. The method of claim 4, wherein determining the prediction difference of the recurrent neural network model based on the difference between the first loss and the second loss is achieved by calculating:

$$\min_{c_1^* c_2^*}[L_c(X) - L_h(X'')]$$

where $L_c(X)$ denotes the first loss, and $L_h(X'')$ denotes the second loss of the hard sample.

8. The method of claim 1, wherein the code-converting module is configured to input a source code of the first training set program and at least one code shifting method, so as to generate at least one type of code shifting programs.

9. The method of claim 1, wherein the mapping module is configured to generate each training program source code as code snippets with different levels of granularity.

* * * * *